US009656246B2

(12) United States Patent
Cola (10) Patent No.: US 9,656,246 B2
(45) Date of Patent: May 23, 2017

(54) VERTICALLY ALIGNED ARRAYS OF CARBON NANOTUBES FORMED ON MULTILAYER SUBSTRATES (75) Inventor: Baratunde A. Cola, Atlanta, GA (US)

(73) Assignee: Carbice Corporation, Atlanta, GA (US)

(*) Notice: Subject to any disclaimer, the term of this patent is extended or adjusted under 35 U.S.C. 154(b) by 809 days.

(21) Appl. No.: 13/546,827

(22) Filed: Jul. 11, 2012

(65) Prior Publication Data
US 2014/0015158 A1 Jan. 16, 2014

(51) Int. Cl.
B01J 23/745 (2006.01)
B82Y 30/00 (2011.01)
C01B 31/02 (2006.01)
B01J 23/42 (2006.01)
B01J 23/44 (2006.01)
(Continued)

(52) U.S. Cl.
CPC .............. B01J 23/745 (2013.01); B01J 21/02 (2013.01); B01J 23/42 (2013.01); B01J 23/44 (2013.01); B01J 23/464 (2013.01); B01J 23/466 (2013.01); B01J 23/468 (2013.01); B01J 23/72 (2013.01); B01J 23/75 (2013.01); B01J 23/755 (2013.01); B01J 35/0006 (2013.01); B01J 35/02 (2013.01); B82Y 30/00 (2013.01); B82Y 40/00 (2013.01); C01B 31/0233 (2013.01); C09K 5/14 (2013.01); C01B 2202/08 (2013.01); Y10S 977/742 (2013.01); Y10S 977/81 (2013.01); Y10T 428/12431 (2015.01); Y10T 428/12493 (2015.01); Y10T 428/12576 (2015.01); Y10T 428/12611 (2015.01);
(Continued)

(58) Field of Classification Search
CPC ...... B01J 23/745; B32B 15/01; B32B 15/012; B82Y 30/00; H01L 21/02606; H01L 23/373; H01L 23/3735; H01L 23/3736; H01L 23/3737; H01L 51/0048; H01L 2924/00; H01L 2924/0002; H01L 2924/01006; Y10S 977/742; C01B 31/022–31/0293; C01B 2202/00; C23C 16/00; C23C 16/26; Y10T 428/30
USPC ................... 423/447.1, 447.2, 448; 428/408
See application file for complete search history.

(56) References Cited

U.S. PATENT DOCUMENTS 2,243,979 A * 6/1941 Reynolds ................. 29/527.2
6,250,127 B1 * 6/2001 Polese ............... C22C 32/0063
72/256
(Continued)

OTHER PUBLICATIONS

Dai et al, "Controlled growth and modification of vertically-aligned carbon nanotubes for multifunctional applications", Jul. 1, 2010, Materials Science and Engineering R, Elsevier, vol. 70, p. 63-91.*
(Continued)

Primary Examiner — Maria Veronica Ewald
Assistant Examiner — Ethan Weydemeyer
(74) Attorney, Agent, or Firm — Pabst Patent Group LLP (57) ABSTRACT Multilayer substrates for the growth and/or support of CNT arrays are provided. These multilayer substrates both promote the growth of dense vertically aligned CNT arrays and provide excellent adhesion between the CNTs and metal surfaces. Carbon nanotube arrays formed using multilayer substrates, which exhibit high thermal conductivity and excellent durability, are also provided. These arrays can be used as thermal interface materials.

23 Claims, 5 Drawing Sheets (51) Int. Cl.
- *B01J 23/46* (2006.01)
- *B01J 23/75* (2006.01)
- *B01J 23/755* (2006.01)
- *B82Y 40/00* (2011.01)
- *B01J 21/02* (2006.01)
- *B01J 23/72* (2006.01)
- *B01J 35/00* (2006.01)
- *B01J 35/02* (2006.01)
- *C09K 5/14* (2006.01)

(52) U.S. Cl.
CPC ...... *Y10T 428/24975* (2015.01); *Y10T 428/25* (2015.01); *Y10T 428/265* (2015.01); *Y10T 428/30* (2015.01)

(56) References Cited

U.S. PATENT DOCUMENTS

| | | | |
|---|---|---|---|
| 6,921,462 B2 | 7/2005 | Montgomery | |
| 6,965,513 B2 | 11/2005 | Montgomery | |
| 7,086,451 B2 | 8/2006 | Leu | |
| 7,465,605 B2 | 12/2008 | Raravikar | |
| 8,093,715 B2 | 1/2012 | Xu | |
| 8,220,530 B2 * | 7/2012 | Cola | B01J 23/745 165/133 |
| 2002/0140336 A1 * | 10/2002 | Stoner | H01J 1/304 313/310 |
| 2004/0065717 A1 * | 4/2004 | Saijo et al. | 228/115 |
| 2005/0214197 A1 * | 9/2005 | Gu | B01J 23/24 423/447.3 |
| 2006/0073089 A1 * | 4/2006 | Ajayan | A61L 27/08 423/447.2 |
| 2007/0253889 A1 * | 11/2007 | Awano | B82Y 30/00 423/447.3 |
| 2008/0095695 A1 | 4/2008 | Shanov | |
| 2008/0149166 A1 * | 6/2008 | Beeson | H01L 31/02322 136/248 |
| 2008/0160866 A1 * | 7/2008 | Zhang | H01J 9/025 445/24 |
| 2008/0236804 A1 * | 10/2008 | Cola | B01J 23/745 165/185 |
| 2008/0241755 A1 * | 10/2008 | Franklin | B82Y 10/00 430/296 |
| 2009/0246507 A1 | 10/2009 | Graham | |
| 2011/0020593 A1 | 1/2011 | Winkler | |
| 2011/0086464 A1 * | 4/2011 | Kim | B82Y 30/00 438/82 |
| 2012/0128880 A1 | 5/2012 | Talapatra | |

OTHER PUBLICATIONS

Bayer, et al., Support-Catalyst-Gas interactions during carbon nanotube growth on metallic to films!, J Phys. Chem., 115:4359-69 (2011).

Cola, et al., "Contact mechanics and thermal conductance of carbon nanotube array interfaces", Int. J. Heat Mass Trans., 52:3490-3503 (2009).

Hildreth, et al., "Conformally coating vertically aligned carbon nanotube arrays using thermal decomposition of iron pentacarbonyl", J Vac Sci Technol. B, 30(3):03D1011-03D1013 (2012).

Kim, et al., "Evolution in ccatalyst morphology leads to carbon nanotube growth termination", J Phys. Chem. Lett, 1:918-22 (2010).

* cited by examiner

VERTICALLY ALIGNED ARRAYS OF CARBON NANOTUBES FORMED ON MULTILAYER SUBSTRATES

FIELD OF THE INVENTION

The invention is generally related to substrates for the growth of carbon nanotube (CNT) arrays, arrays of aligned CNTs, as well as methods of making and using thereof.

BACKGROUND OF THE INVENTION

Carbon nanotubes (CNTs) possess a variety of useful properties, including high thermal conductivity, tensile strength, and elastic modulus. Carbon nanotubes have been investigated for applications in nanotechnology, electronics, optics, and other fields of materials science and technology.

CNTs exhibit high thermal conductivity, with multi-wall carbon nanotubes (MWCTs) exhibiting thermal conductivities up to about 3,000 W/mK at room temperature, and single-wall carbon nanotubes (SWNTs) exhibiting thermal conductivities up to about 5,000 to 8,000 W/mK at room temperature. As a result, CNTs, especially vertically aligned arrays of CNTs, have attracted significant interest for use in thermal interface materials (TIMs). In order to function efficiently and maintain performance over time, the CNTs should be well anchored to a support structure, uniformly aligned, preferably perpendicular to the support surface, and be present at a high density on the support structure.

However, in spite of the tremendous potential of such materials, it has proven difficult to form dense and well aligned CNT arrays on metal surfaces, and to achieve good adhesion between the metal and CNTs. Typically, arrays of aligned carbon nanotubes are grown from surfaces containing a thin film (<1 nm thick) of catalyst, such as iron, supported on a metal oxide film, such as alumina, with a thickness of between 10 and 200 nm. Under growth conditions, the catalyst forms small (<10 nm) islands or particles on the surface of the oxide film from which the nanotubes grow. The catalyst particles pack on the surface, constraining the nanotube growth to a direction perpendicular to the surface.

Unfortunately, CNT arrays grown from these surfaces display limited density and yield. This is the result of migration of the catalyst particles into the oxide film during the course of nanotube growth. See, for example, Amama, P. B. et al. ACS Nano, 4:895-904 (2010) and Kim, S. M. et al. J. Phys. Chem. Lett. 1:918-922 (2010). In addition, CNT arrays formed in this fashion are generally poorly adhered to underlying metal surfaces, because the oxide layer, incorporated to promote dense and aligned CNT growth, does not adhere well to the underlying metal surface.

In order to provide improved CNT arrays for use as thermal interface materials (TIMs), CNT arrays with higher nanotube density and improved nanotube adhesion are required.

Therefore, it is an object of the invention to provide surfaces for the growth of high density arrays of carbon nanotubes, and methods of use thereof.

It is a further object of the invention to provide arrays of vertically aligned CNTs which are well adhered to a metallic surface.

It is also an object of the invention to provide arrays of vertically aligned arrays of CNTs for use as TIMs.

SUMMARY OF THE INVENTION

Multilayer substrates for the growth and/or support of CNT arrays are provided. Multilayer substrates promote the growth of dense vertically aligned CNT arrays and provide excellent adhesion between the CNTs and metal surfaces.

The multilayer substrates contain three or more layers deposited on an inert support, such as a metal surface. Generally, the multilayer substrate contains an adhesion layer, an interface layer, and a catalytic layer, deposited on the surface of an inert support. Generally, the support is formed at least in part from a metal, such as aluminum, platinum, gold, nickel, iron, tin, lead, silver, titanium, indium, copper, or combinations thereof. In certain instances, the support is a metallic foil, such as aluminum or copper foil. The support may also be a surface of a device, such as a conventional heat sink or heat spreader used in heat exchange applications.

The adhesion layer is formed of a material that improves the adhesion of the interface layer to the support. In certain embodiments, the adhesion layer is a thin film of iron. Generally, the adhesion layer must be thick enough to remain a continuous film at the elevated temperatures used to form CNTs. The adhesion layer also generally provides resistance to oxide and carbide formation during CNT synthesis at elevated temperatures.

The interface layer is preferably formed from a metal which is oxidized under conditions of nanotube synthesis or during exposure to air after nanotube synthesis to form a suitable metal oxide. Examples of suitable materials include aluminum. Alternatively, the interface layer may be formed from a metal oxide, such as aluminum oxide or silicon oxide. Generally, the interface layer is thin enough to allow the catalytic layer and the adhesion layer to diffuse across it. In some embodiments wherein the catalytic layer and the adhesion layer have the same composition, this reduces migration of the catalyst into the interface layer, improving the lifetime of the catalyst during nanotube growth.

The catalytic layer is typically a thin film formed from a transition metal that can catalyze the formation of carbon nanotubes via chemical vapor deposition. Examples of suitable materials that can be used to form the catalytic layer include iron, nickel, cobalt, rhodium, palladium, and combinations thereof. In some embodiments, the catalytic layer is formed of iron. The catalytic layer is of appropriate thickness to form catalytic nanoparticles or aggregates under the annealing conditions used during nanotube formation.

CNT arrays containing a plurality of vertically aligned CNTs on a material are also provided. The CNTs are well anchored to the material, and are present in a high density.

In some embodiments, the CNT array is formed by vertically aligning a plurality of CNTs on the multilayer substrate described above. This can be accomplished, for example, by transferring an array of CNTs to the distal ends of CNTs grown on the multilayer substrate. In some embodiments, tall CNT arrays are transferred to the distal ends of very short CNTs on the multilayer substrate. This technique improves the bond strength by increasing the surface area for bonding.

In other embodiments, the multilayer substrate serves as catalytic surface for the growth of a CNT array. In these instances, the process of CNT growth using chemical vapor deposition alters the morphology of the multilayer substrate. Specifically, upon heating, the interface layer is converted to a metal oxide, and forms a layer or partial layer of metal oxide nanoparticles or aggregates deposited on the adhesion layer. The catalytic layer similarly forms a series of catalytic nanoparticles or aggregates deposited on the metal oxide nanoparticles or aggregates. During CNT growth, CNTs form from the catalytic nanoparticles or aggregates. The resulting CNT arrays contain CNTs anchored to an inert support via an adhesion layer, metal oxide nanoparticles or aggregates, and/or catalytic nanoparticles or aggregates.

The metal oxide nanoparticles or aggregates typically contain a metal oxide formed from the metal or metals used to form the interface layer. For example, in embodiments where the interface layer is formed from aluminum, the metal oxide nanoparticles or aggregates are formed from aluminum oxide. The catalytic nanoparticles or aggregates may be composed of the metal used to form the catalytic layer.

Generally, the nanotubes are present at a sufficient density such that the nanotubes are self-supporting and adopt a substantially perpendicular orientation to the surface of the multilayer substrate. Preferably, the nanotubes are spaced at optimal distances from one another and are of uniform height to minimize thermal transfer losses, thereby maximizing their collective thermal diffusivity.

The CNTs display strong adhesion to the multilayer substrate. In certain embodiments, the CNT array will remain substantially intact after being immersed in a solvent, such as ethanol, and sonicated for a period of at least five minutes.

In a particular embodiment, the multilayer substrate is formed from an iron adhesion layer of about 30 nm in thickness, an aluminum or alumina interface layer of about 10 nm in thickness, and an iron catalytic layer of about 3 nm in thickness deposited on a metal surface. In this embodiment, the iron adhesion layer adheres to both the metal surface and the Al (alumina nanoparticles or aggregates after growth) or $Al_2O_3$ interface layer. The iron catalytic layer forms iron nanoparticles or aggregates from which CNTs grow. These iron nanoparticles or aggregates are also bound to the alumina below.

As a result, well bonded interfaces exist on both sides of the oxide interface materials. Of metal/metal oxide interfaces, the iron-alumina interface is known to be one of the strongest in terms of bonding and chemical interaction. Further, metals (e.g., the iron adhesion layer and the metal surface) tend to bond well to each other because of strong electronic coupling. As a consequence, the CNTs are strongly anchored to the metal surface.

Further, subsurface diffusion of iron from the catalytic layer during nanotube growth is reduced because the same metal is on both sides of the oxide support, which balances the concentration gradients that would normally drive diffusion. Therefore, catalyst is not depleted during growth, improving the growth rate, density, and yield of nanotubes in the array.

The CNT arrays described herein can be used as thermal interface materials. The CNT arrays can be formed and/or deposited, as required for a particular application.

For example, in one embodiment, the inert support for the CNT array is piece of metal foil, such as aluminum foil. In these cases, CNTs are anchored to a surface of the metal foil via an adhesion layer, metal oxide nanoparticles or aggregates, and catalytic nanoparticles or aggregates. In some instances only one surface (i.e., side) of the metal foil contains an array of aligned CNTs anchored to the surface. In other cases, both surfaces (i.e., sides) of the metal foil contain an array of aligned CNTs anchored to the surface. If desired one or more polymers may be applied to the CNT array. The CNT array may also be decorated with one or more types of metal nanoparticles. Polymers and metal nanoparticles may be applied together to the CNT array if desired. Immersing the arrays in liquid and then evaporating the liquid such that capillary forces during drying change the local and or global morphology of the CNTs may also be used to modify the CNT arrays. In other embodiments, a flowable or phase change material may be added to the CNT arrays to fill the space between the CNTs. These materials may be placed or affixed in between a heat source and a heat sink or heat spreader, such as between an integrated circuit package and a finned heat exchanger, to improve the transfer of heat from the heat source to the heat sink or heat spreader.

In other embodiments, the inter support for the CNT array is a surface of a conventional metal heat sink or heat spreader. In these cases, CNTs are anchored to a surface of the heat sink or heat spreader via an adhesion layer, metal oxide nanoparticles or aggregates, and catalytic nanoparticles or aggregates. This functionalized heat sink or heat spreader may then be abutted or adhered to a heat source, such as an integrated circuit package.

The CNT arrays described herein can be used as thermal interface materials in personal computers, server computers, memory modules, graphics chips, radar and radio-frequency (RF) devices, device burn-in testing systems, disc drives, displays, including light-emitting diode (LED) displays, lighting systems, automotive control units, power-electronics, batteries, communications equipment, such as cellular phones, thermoelectric generators, and imaging equipment, including MRIs.

DETAILED DESCRIPTION OF THE INVENTION

I. Definitions

"Thermal Interface Material" (TIM), as used herein, refers to a material or combination of materials that provide high thermal conductance and mechanical compliance between a heat source and heat sink or spreader to effectively conduct heat away from a heat source.

"Carbon Nanotube Array" or "CNT array", as used herein, refers to a plurality of carbon nanotubes which are vertically aligned on a surface of a material. Carbon nanotubes are said to be "vertically aligned" when they are substantially perpendicular to the surface on which they are supported or attached. Nanotubes are said to be substantially perpendicular when they are oriented on average within 30, 25, 20, 15, 10, or 5 degrees of the surface normal.

II. Multilayer Substrates

Multilayer substrates for the formation of carbon nanotube arrays promote the growth of dense vertically aligned CNT arrays and provide excellent adhesion between the CNTs and metal surfaces. Multilayer substrates also promote high CNT growth rates on metal surfaces. Multilayer substrates contain three or more metallic thin films deposited on the surface of an inert, preferably metallic support.

Figure 1:
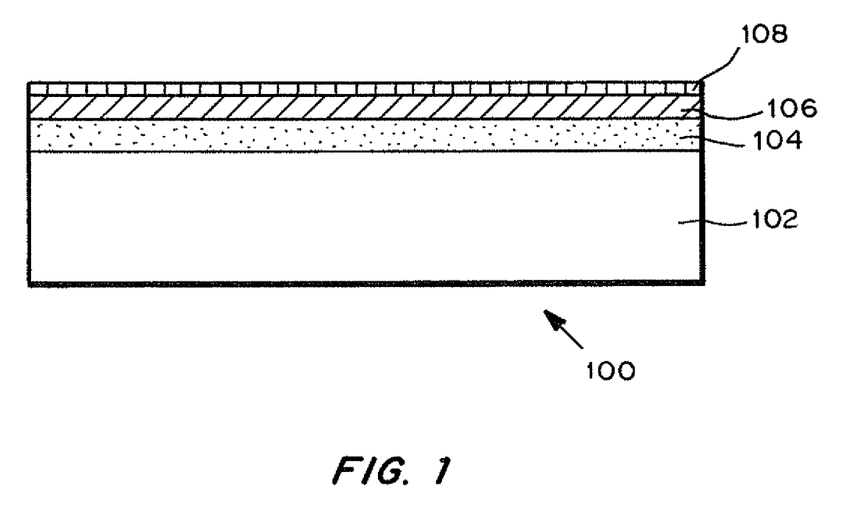
FIG. 1 is a cross section of a multilayer substrate for the formation and/or support of carbon nanotube arrays.

An exemplary multilayer substrate (100) is shown in FIG. 1. The multilayer substrate contains three layers (an adhesion layer, 104; an interface layer, 106; and a catalytic layer, 108) deposited on the surface of an inert support (102).

A. Supports

A variety of materials can serve as a support for multilayer substrates. Generally, the support is inert, meaning that the support does not chemically participate in the formation of nanotubes on the multilayer substrate.

Generally, the support is formed at least in part from a metal, such as aluminum, cobalt, chromium, zinc, tantalum, platinum, gold, nickel, iron, tin, lead, silver, titanium, indium, copper, or combinations thereof and/or one or more metal oxides, such as oxides of the metals listed above. Other materials include ceramics and silicon or silicon compounds, such as silicon dioxide.

In some instances, the support is a readily deformable and/or flexible sheet of solid material. In certain embodiments, the support is a metallic foil, such as aluminum foil or copper foil.

The support may also be a surface of a conventional heat sink or heat spreader used in heat exchange applications. Such heat sinks may be formed from a variety of materials including copper, aluminum, copper-tungsten pseudoalloy, AlSiC (silicon carbide in an aluminum matrix), Dymalloy (diamond in copper-silver alloy matrix), and E-Material (beryllium oxide in beryllium matrix).

In some embodiments, the surface of the support may be treated to increase adhesion with the adhesion layer. Such treatment may include the use of plasma-assisted or chemical-based surface cleaning. Another treatment would include the deposition of a metal or metal oxide coating or particles on the support.

Multilayer substrates can be formed on one or more surfaces of a suitable support. For example, in certain embodiments, the support is a metallic foil. In these instances, multilayer substrates can be formed on one or both sides of the metallic foil as required for a particular application.

The support, and conditions under which the CNTs are formed, should be selected such that the support resists reacting with the catalyst, process gases, and/or residual gases through reactions, such as oxidation, silicidation, alloying, and/or carbide formation. For example, C, Co, H, and N are the elements composing most CNT CVD process and contamination gases. Under certain conditions, the support can react to form oxides, carbides, and other byproducts which significantly reduce CNT growth which in turn leads to loss of electrical conduction in the support. Reaction conditions, such as temperature, can be selected in order to minimize adverse reactions of the support.

B. Adhesion Layers

Adhesion layers are formed of a material that improves the adhesion of the interface layer to the support.

In preferred embodiments, the adhesion layer is of the same chemical composition as the catalytic layer. In these cases, the adhesion layer may be designed, in combination with the interface layer, to reduce migration of the catalytic layer into the interface layer during nanotube synthesis.

In some embodiments, the adhesion layer is iron or an iron alloy. In other embodiments, the adhesion layer is nickel or a nickel alloy. The adhesion layer may also be any transition metal, or alloy of that metal, that can also serve as CNT catalyst.

In embodiments where the multilayer substrate is employed as a substrate for the growth of carbon nanotubes, the adhesion layer must be thick enough to remain as a continuous film at the elevated temperatures utilized to form CNTs. In certain cases, the adhesion layer may have a thickness of between about 10 nm and about 150 nm, more preferably between about 10 nm and about 100 nm, more preferably between about 10 nm and about 75 nm, most preferably between about 15 nm and about 50 nm. In certain embodiments, the adhesion layer has a thickness of about 30 nm.

The adhesion layer should provide good resistance to oxide and carbide formation during CNT synthesis at elevated temperatures. In certain cases, the energy of oxide formation for the adhesion layer may be greater than −4.5 eV, more preferably greater than −3.5 eV, most preferably greater than −2.75 eV. In certain cases, the energy of carbide formation for the adhesion layer may be greater than −2.5 eV, more preferably greater than −1.5 eV, most preferably greater than −0.5 eV.

C. Interface Layers

In certain embodiments, the interface layer is formed from a metal which is oxidized under conditions of nanotube synthesis or during exposure to air after nanotube synthesis to form a suitable metal oxide. Examples of suitable materials include aluminum, titanium, gold, copper, silver, and tantalum.

Alternatively, the interface layer may be formed from a metal oxide, such as aluminum oxide, silicon oxide, or titanium dioxide.

In preferred embodiments, the interface layer is thin enough to allow the catalytic layer and the adhesion layer to diffuse across its thickness. In embodiments wherein the catalytic layer and the adhesion layer have the same composition, this reduces migration of the catalyst into the interface layer, improving the lifetime of the catalyst during nanotube growth.

In certain embodiments, the interface layer has a thickness of between about 5 nm and about 50 nm, more preferably between about 7 nm and about 30 nm, most preferably between about 7 nm and about 15 nm. In certain embodiments, the interface layer has a thickness of about 10 nm.

D. Catalytic Layer

The catalytic layer is typically a thin film formed from a transition metal that can catalyze the formation of carbon nanotubes via chemical vapor deposition. Preferably, the catalytic layer is formed of a material that is resistant to oxidation and/or carbide formation under the chemical vapor deposition conditions used to form CNT arrays.

Examples of suitable materials that can be used to form the catalytic layer include, but are not limited to, iron, nickel, cobalt, rhodium, palladium, osmium, iridium, platinum, and combinations thereof. In particular embodiments, the catalytic layer contains only materials that catalyze CNT formation, such as one or more transition metals, including those listed above. In other embodiments, the catalytic layer materials that catalyze CNT formation do not contain one or more non-catalytic materials. In preferred embodiments, the catalytic layer is formed of iron.

The catalytic layer is of appropriate thickness to aggregate into small catalytic particles under annealing conditions. The catalytic layer typically has a thickness of less than about 10 nm. In preferred embodiments, the catalytic layer has a thickness of between about 10 nm and about 1 nm, more preferably between about 5 nm and about 1 nm, more preferably between about 2 nm and about 5 nm. In certain embodiments, the catalytic layer has a thickness of about 3 nm.

E. Methods of Making

Multilayer substrates can be formed using a variety of well-developed techniques for the deposition of metallic thin films. Non-limiting examples of such techniques include evaporation, sputter deposition, and chemical vapor deposition. In some embodiments, the multilayers are formed by sputter deposition and/or chemical vapor deposition, which can be easier to scale up.

Evaporation can be used to deposit thin films of a variety of metals. The source material to be deposited (e.g., a metal) is evaporated in a vacuum. The vacuum allows vapor particles to travel directly to the target object (support), where they condense back into a solid state, forming a thin film on the target object. Methods of forming thin films using evaporation are well known in the art. See, for example, S. A. Campbell, *Science and Engineering of Microelectronic Fabrication*, 2$^{nd}$ Edition, Oxford University Press, New York (2001). Evaporation typically requires a high vacuum; however, it is applicable to a variety of metals, and can deposit metal at rates of up to 50 nm/s. If desired, masks can be used to pattern the metallic thin films on the target object.

Metallic and metal oxide thin films can also be formed by chemical vapor deposition (CVD). Gas precursors containing the source material to be deposited by CVD (e.g., a metal or metal oxide) are feed into closed chamber. The chamber can be at atmospheric pressure or at various grades of vacuum. The chamber walls can be hot or a heated stage can be used with cold chamber walls to increase the deposition rate on the target object (support). Methods of forming thin films using CVD are well known in the art. See, for example, S. A. Campbell, *Science and Engineering of Microelectronic Fabrication*, 2$^{nd}$ Edition, Oxford University Press, New York (2001). CVD deposition of metals, such as iron, aluminum, and titanium, has been demonstrated, so has CVD deposition of oxides such as aluminum oxide and silicon oxide. CVD deposition rates can be as low as 1 nm/cycle.

In one embodiment, electron-beam evaporation is used to form the multilayer structure on the support. Each layer is deposited at a pressure less than 0.001 mTorr. The adhesion layer is deposited at an evaporation rate of 0.3 nm/s. The interface and catalytic layers are each deposited at an evaporation rate of 0.1 nm/s.

III. CNT Arrays

CNT arrays contain a plurality of carbon nanotubes which are vertically aligned on the surface of a material. In some embodiments, the CNTs are vertically aligned on the multilayer substrate described above.

In other embodiments, the CNT arrays are grown on the multilayer substrates described above by chemical vapor deposition. In these instances, the process of CNT growth alters the morphology of the multilayer substrate. Specifically, upon heating or exposure to air after growth, the interface layer is converted to a metal oxide, and forms a layer of metal oxide nanoparticles or aggregates deposited on the adhesion layer. The catalytic layer similarly forms a series of catalytic nanoparticles or aggregates deposited on the metal oxide nanoparticles or aggregates. During CNT growth, CNTs form from the catalytic nanoparticles or aggregates.

The metal oxide nanoparticles or aggregates typically contain metal oxide formed from a metal used to form the interface layer. For example, in embodiments where the interface layer is formed from aluminum, the metal oxide nanoparticles or aggregates are formed from aluminum oxide. In embodiments where the interface layer is formed from a metal oxide, the metal oxide nanoparticles or aggregates may be composed of the metal oxide used to form the parent interface layer. The metal oxide nanoparticles or aggregates may further contain one or more metals which diffuse into the metal oxide nanoparticles or aggregated from the catalytic layer, adhesion layer, or combinations thereof. The catalytic nanoparticles or aggregates may be composed of the metal used to form the parent catalytic layer.

Figure 2:
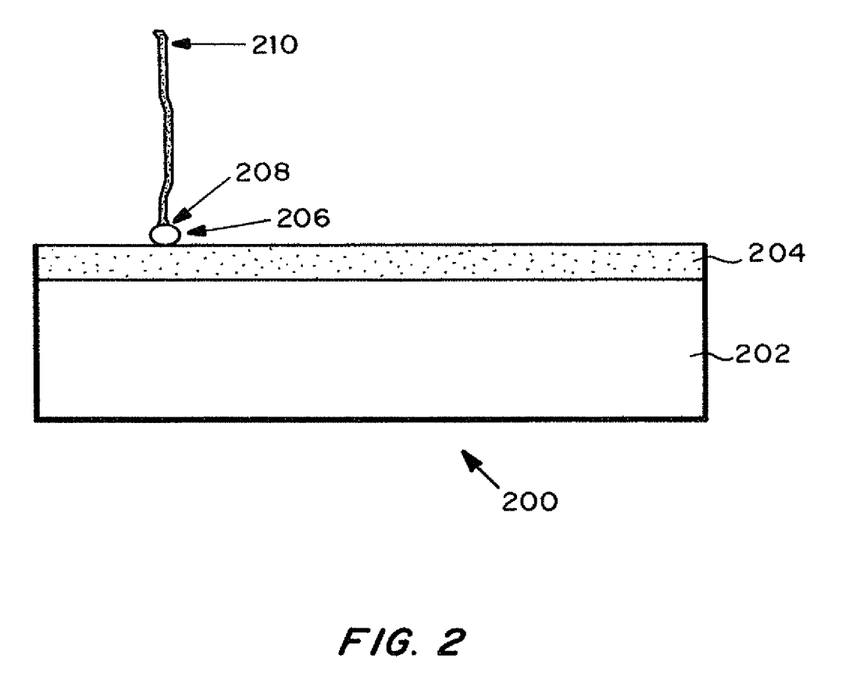
FIG. 2 is a cross section of a carbon nanotube arrays formed by chemical vapor deposition on a multilayer substrate. For clarity, only a single nanotube, catalytic nanoparticle or aggregate, and metal oxide nanoparticle or aggregate are illustrated.

The structure of a CNT array grown on the multilayer substrates described above (200) is shown in FIG. 2. These CNT arrays contain CNTs (210) anchored to an inert support, preferably a metal surface, (202) via an adhesion layer (204), metal oxide nanoparticles or aggregates (206), and catalytic nanoparticles or aggregates (208).

Generally, the nanotubes are present at a sufficient density such that the nanotubes are self-supporting and adopt a substantially perpendicular orientation to the surface of the multilayer substrate. In some embodiments, the nanotubes are oriented, on average, within 30, 25, 20, 15, 10, or 5 degrees of the surface normal of a line drawn perpendicular to the surface of the support. Preferably, the nanotubes are spaced at optimal distances from one another and are of uniform height to minimize thermal transfer losses, thereby maximizing their collective thermal diffusivity.

In some embodiments, the nanotube density on the substrate surface ranges from about $1\times10^7$ to $1\times10^{11}$ nanotubes per mm$^2$, more preferably from about $1\times10^8$ to $1\times10^{10}$ nanotubes per mm$^2$, most preferably from about $1\times10^9$ to $1\times10^{10}$ nanotubes per mm$^2$.

The CNTs display strong adhesion to the multilayer substrate. In certain embodiments, the CNT array will remain substantially intact after being immersed in a solvent, such as ethanol, and sonicated for a period of at least five minutes. "Substantially intact" as used herein, means that more than 90%, 95%, 96%, 97%, 98%, 99%, or 99.9% of the CNTs remained on the surface after sonication, and there was less than 1% change in the thermal resistance of the CNT-multilayer support interface after sonication. In some embodiments, the thermal resistance of the CNT-support interface ranges from 1 to 0.1 mm$^2$K/W, more preferred from 0.5 to 0.1 mm$^2$K/W, most preferred from 0.25 to 0.1 mm$^2$K/W.

The adhesion of CNT arrays to the substrate can also be measured using industry standard die shear testing. In this test the free ends of the CNTs are affixed to another substrate, which is pushed with controlled force parallel to the substrate until the CNTs are torn from their interface with the multilayer support. In some embodiments, the die shear strength of the CNT-multilayer support interface ranges from 0.2 to 3 MPa, more preferably from 0.5 to 3 MPa, most preferably 1 to 3 MPa.

Figure 3:
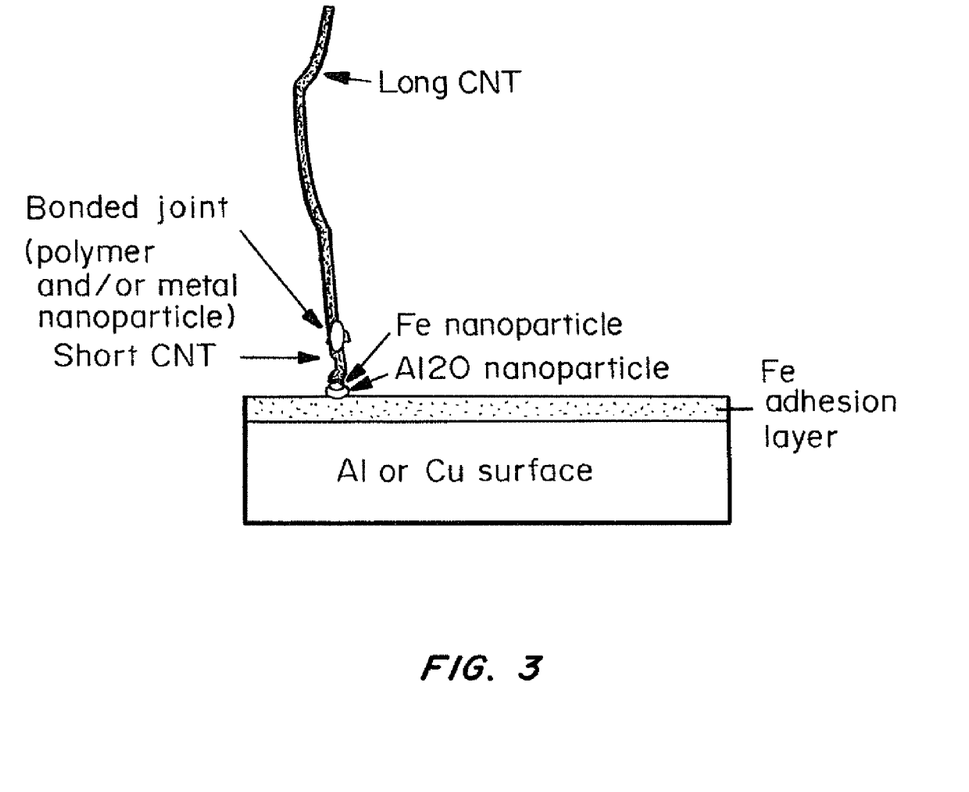
FIG. 3 is a diagram showing the transfer printing of long carbon nanotubes onto an array of short carbon nanotubes.

In certain embodiments, one or more polymers are applied to the CNT array. One or more polymers may be adsorbed to the distal ends of the CNTs to bond the distal ends of the CNTs to a surface, reduce thermal resistance between the CNT array and a surface, or combinations thereof. Polymers can be applied to CNT arrays using a variety of methods known in the art. For example, polymers can be dissolved in a suitable solvent, and sprayed or spin coated onto the distal end of the CNTs. A representation is shown in FIG. 3.

Examples of suitable polymers include conjugated and aromatric polymers, such as poly(3-hexylthipohene) (P3HT), polystyrene, and blends thereof. Other examples of suitable polymers that are neither conjugated nor aromatic include polyvinyl alcohol (PVA), poly(methyl methacrylate) (PMMA), polydimethylsiloxane (PDMS), and blends thereof.

In certain embodiments, one or more metal nanoparticles are applied to the CNT array. One or more metal nanoparticles may be adsorbed to the distal ends of the CNTs to bond the distal ends of the CNTs to a surface, reduce thermal resistance between the CNT array and a surface, or combinations thereof. Metal nanoparticles can be applied to CNT arrays using a variety of methods known in the art. For example, a solution of metal thiolate such as palladium hexadecanethiolate can be sprayed or spin coated onto the distal ends of the CNTs, and the organics can be baked off to leave palladium nanoparticles.

In another example, electron-beam or sputter deposition can be used to coat metal nanoparticles or connected "film-like" assemblies of nanoparticles onto the distal ends of the CNTs.

Examples of suitable metal nanoparticles include palladium, gold, silver, titanium, iron, nickel, copper, and combinations thereof.

In certain embodiments, one or more polymers are applied together with one or more metal nanoparticles to the CNT array. The polymers and metal nanoparticles are both adsorbed to the distal ends of the CNTs to bond the distal ends of the CNTs to a surface, reduce thermal resistance between the CNT array and a surface, or combinations thereof. The polymers and metal nanoparticles are applied together using a variety of methods known in the art. For example, a solution of metal thiolate such as palladium hexadecanethiolate can be sprayed or spin coated onto the distal ends of the CNTs, and the organics can be baked off to leave palladium nanoparticles. Then, polymers can be dissolved in a suitable solvent, and sprayed or spin coated onto the distal ends of the CNTs that were coated in the previous step with metal nanoparticles.

Figure 4:
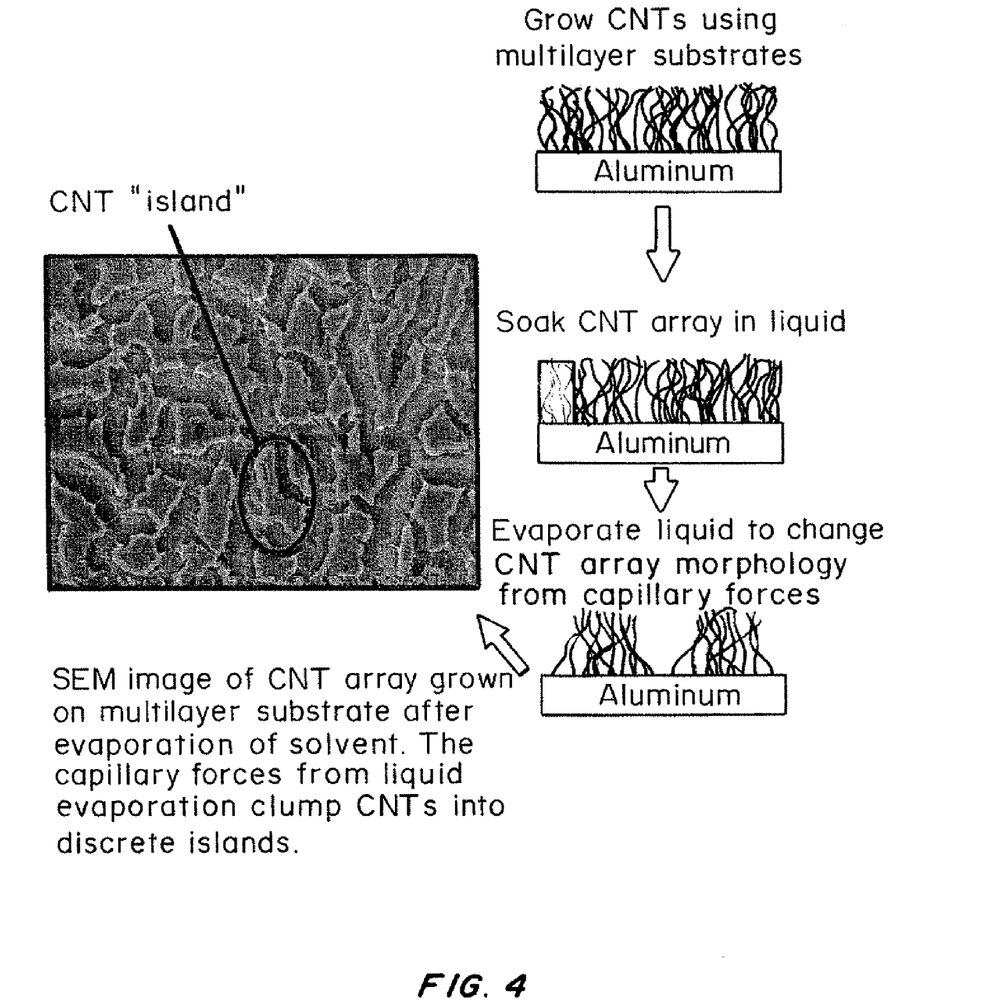
FIG. 4 is a schematic showing the change in morphology when a CNT array is immersed in a liquid. The SEM image shows the aggregation of CNTs into discrete islands due to the capillary action of the solvent evaporation.

In certain embodiments, flowable or phase change materials are applied to the CNT array. Flowable or phase change materials may be added to the CNT array to displace the air between CNTs and improve contact between the distal ends of CNTs and a surface, and as a result reduce thermal resistance of the array and the contact between the array and a surface, or combinations thereof. Flowable or phase change materials can be applied to CNT arrays using a variety of methods known in the art. For example, flowable or phase change materials in their liquid state can be wicked into a CNT array by placing the array in partial or full contact with the liquid. A representation is shown in FIG. 4.

Examples of suitable flowable or phase change materials include paraffin waxes, polyethylene waxes, hydrocarbon-based waxes in general, and blends thereof. Other examples of suitable flowable or phase change materials that are neither wax nor polymeric include liquid metals, oils, organic-inorganic and inorganic-inorganic eutectics, and blends thereof.

Figure 5:
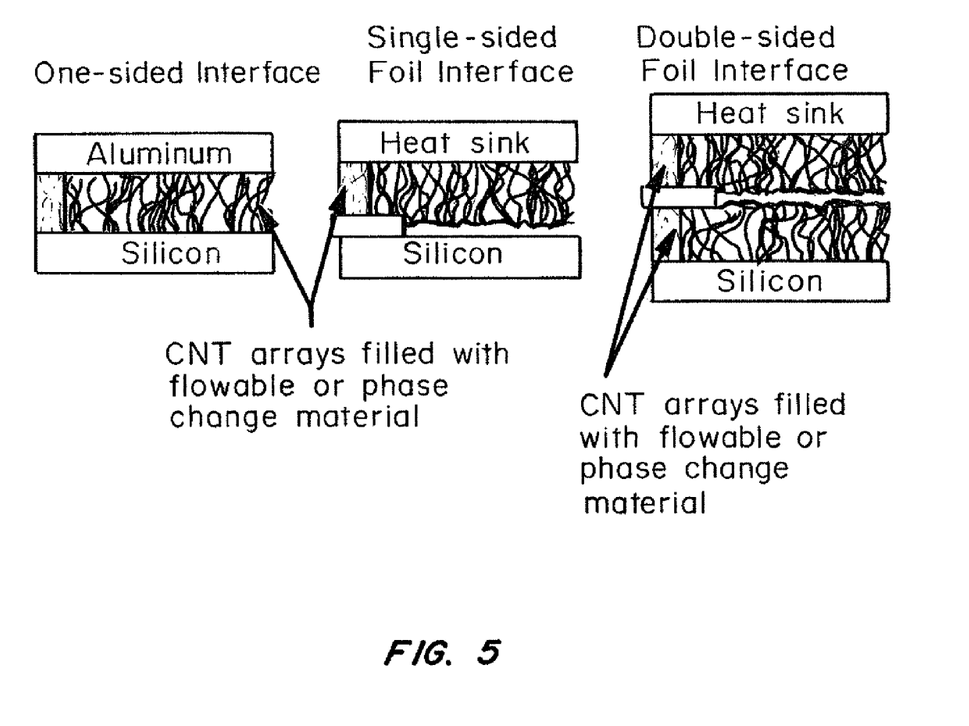
FIG. 5 is a schematic showing CNT arrays immersed in flowable of phase change materials.

In certain embodiments, a liquid is added to the CNT array and then evaporated to alter the morphology of the array. Capillary forces that result from liquid evaporation can draw CNTs together into patterns, which facilitate the addition of flowable or phase change materials to the array, and/or pull additional CNTs in contact with a surface, and as a result reduce thermal resistance of the contact between the array and a surface, or combinations thereof. Capillary-driven altering of CNT arrays can be accomplished using a variety of methods known in the art. For example, solvent can be applied to the CNT array and the array can be placed in an interface in the wet state and allowed to dry, activating the capillary forces that ultimately drive CNTs into contact with the surface. In another example, the CNT array soaked with solvent can be allowed to dry free from surface contact to form patterns in the array. A representation is shown in FIG. 5.

Examples of suitable liquids that can be evaporated from CNT arrays to change their morphology include solvents such as toluene, isopropanol, and chloroform, and any other liquid that wets the CNT arrays sufficiently to penetrate their entire depth.

A. Carbon Nanotubes

The CNT arrays contain nanotubes which are continuous from the top of the array (i.e., the surface formed by the distal end of the carbon nanotubes when vertically aligned on the multilayer substrate) to bottom of the array (i.e., the surface of the multilayer substrate). The array may be formed from multi-wall carbon nanotubes (MWNTs), which generally refers to nanotubes having between approximately 4 and approximately 10 walls. The array may also be formed from few-wall nanotubes (FWNTs), which generally refers to nanotubes containing approximately 1-3 walls. FWNTs include single-wall carbon nanotubes (SWNTs), double-wall carbon nanotubes (DWNTS), and triple-wall carbon nanotubes (TWNTs). In certain embodiments, the nanotubes are MWNTs. In some embodiments, the diameter of MWNTs in the arrays ranges from 10 to 40 nm, more preferably 15 to 30 nm, most preferably about 20 nm. The length of MWNTs in the arrays can range from 1 to 5,000 micrometers, preferably 5 to 5000 micrometers, preferably 5 to 2500 micrometers, more preferably 5 to 2000 micrometers, more preferably 5 to 1000 micrometers.

B. Methods of Forming CNT Arrays

In preferred embodiments, the CNTs are grown on the multilayer substrate using chemical vapor deposition.

Generally, CNT formation begins by annealing the multilayer substrate. A suitable carbon source gas is then introduced, and the temperature is increased to the growth temperature.

The multilayer substrate is generally annealed for a short period of time, for example for approximately ten minutes. Typically, the multilayer substrate is annealed under flow of an inert gas, such as nitrogen or argon. In certain embodiments, the annealing temperature is between about 500° C. and about 650° C., more preferably between about 500° C. and about 600° C., most preferably between about 525° C. and about 575° C.

In preferred embodiments, the CNTs are grown on the multilayer substrate at a growth temperature that is less than the melting temperature of aluminum (approximately 660° C.). In certain embodiments, the CNTs are grown on the multilayer substrate at a growth temperature of between about 600° C. and about 660° C., more preferably between about 610° C. and about 650° C., most preferably between about 620° C. and about 640° C. In certain embodiments, the CNTs are grown on the multilayer substrate at a growth temperature of about 630° C.

Any suitable carbon source gas may be used. In some embodiments, the carbon source gas is acetylene. Other suitable carbon source gases include ethene, ethylene, methane, n-hexane, alcohols, xylenes, metal catalyst gases (e.g., carbonyl iron), and combinations thereof. In some embodiments, the source gas is a metal catalyst gas, which can be used with or without the catalyst layer.

In other embodiments, arrays of vertically aligned CNTs are fabricated on another surface, and transferred, using methods known in the art, to the distal ends of CNTs on the multilayer substrate. For example, a CNT array that is 5 micrometers or shorter is grown on the multilayer substrate. Then a very tall CNT array, around 500 micrometers in length, is transferred distal-end-to-distal-end onto the short CNTs adhered to the multilayer substrate. The distal ends of the two CNT arrays are bonded by polymers, metal nanoparticles, or a combination of both by coating the distal ends with such before the transfer. This technique is referred to as transfer printing. In the case of metal nanoparticle bonding, the CNT arrays and multilayer substrate are heated to promote metal diffusion and to secure the bond. As an example, the heating is done at 300 degrees Celsius in air for 30 min to and 1 hour; and the two CNT arrays are placed under 20 to 40 psi of pressure during heating.

IV. Methods of Use

The CNT arrays described herein can be used as thermal interface materials. The CNT arrays can be formed and/or deposited, as required for a particular application.

For example, in one embodiment, the inert support for the multilayer substrate and CNT arrays is a piece of metal foil, such as aluminum foil. In these cases, CNTs are anchored to a surface of the metal foil via an adhesion layer, metal oxide nanoparticles or aggregates, and catalytic nanoparticles or aggregates. In some instances only one surface (i.e., side) of the metal foil contains an array of aligned CNTs anchored to the surface. In other cases, both surfaces (i.e., sides) of the metal foil contains an array of aligned CNTs anchored to the surface. If desired, one or more polymers, metal particles, or combinations thereof may be applied to the CNT array.

These materials may be placed or affixed in between a heat source and a heat sink or heat spreader, such as between an integrated circuit package and a finned heat exchanger, to improve the transfer of heat from the heat source to the heat sink or spreader.

CNT arrays of this type exhibit both high thermal conductance and mechanical durability. As a consequence, these arrays are well suited for applications where repeated cycling is required. For example, foils of this type can be employed as thermal interface materials during 'burn-in' testing of electrical components, such as chips.

In other embodiments, the inert support for the multilayer substrate and CNT arrays is a surface of a conventional metal heat sink or spreader. In these cases, CNTs are anchored to a surface of the heat sink or spreader via an adhesion layer, metal oxide nanoparticles or aggregates, and catalytic nanoparticles or aggregates. This functionalized heat sink or spreader may then be abutted or adhered to a heat source, such as an integrated circuit package.

The CNT arrays described herein can be used as thermal interface materials in personal computers, server computers, memory modules, graphics chips, radar and radio-frequency (RE) devices, disc drives, displays, including light-emitting diode (LED) displays, lighting systems, automotive control units, power-electronics, solar cells, batteries, communications equipment, such as cellular phones, thermoelectric generators, and imaging equipment, including MRIs.

The CNT arrays can also be used for applications other than heat transfer. Examples include, but are not limited to, microelectronics, through-wafer vertical interconnect assemblies, and electrodes for batteries and capacitors. Currently, copper and aluminum foil are used as the backing materials for the anode and cathode in lithium ion batteries. A slurry of activated carbon and the lithium materials is pasted onto the foils. The electrical contact between the paste and the foil is a point of parasitic resistance. In addition to reduced electrical output this resistance can impede heat rejection from the device. Well adhered vertical CNT arrays placed at this interface would improve performance electrically and thermally.

The CNT foils could also be used for electromagnetic shielding. The CNTs act to effectively absorb electromagnetic irradiation as well as solar absorbing material, to enhance solar absorption in solar hot water heaters.

EXAMPLES

Example 1

Preparation of Carbon Nanotube (CNT) Arrays

Aluminum foil was purchased at a thickness of 10 micrometers from Alfa Aesar. A piece of aluminum foil was placed in a square sample holder in a Denton Explorer electron-beam evaporator. The sample holder clamped the aluminum foil around its edges and a 5×5 inch square of the aluminum foil was exposed on the front- and backside of the sample holder, which could be flipped in-situ to deposit metal on both sides of the foil without breaking vacuum.

One side at a time, an adhesion layer of iron was deposited to a thickness of 30 nm, then an interface layer of aluminum was deposited to a thickness of 10 nm, and finally a catalytic layer of iron was deposited to a thickness of 3 nm.

The aluminum layer was allowed to cool for 10 minutes before depositing the catalytic iron film. The depositions all occurred at a chamber pressure of approximately 0.0008 mTorr. The iron adhesion layers were deposited at a rate of 0.1 nm/s; the aluminum interface layers were deposited at a rate of 0.1 nm/s; and the iron catalytic layer was deposited at a rate of 0.05 nm/s. The deposited multilayer substrates were allowed to cool for 15 min before venting the chamber and removing the aluminum foil.

An AIXTRON™ Black Magic CVD tool was used to grow CNTs on the multilayer substrates. The aluminum foil with multilayers on both sides was placed on a stage in the CVD tool. The sample was heated in a nitrogen atmosphere at 10 Torr to a temperature of 550 degrees Celsius, and then the sample was annealed at this temperature for 10 minutes in nitrogen at 10 Torr. Hydrogen was fed into the chamber at the end of the nitrogen annealing step and the sample was held at the annealing temperature for an additional 3 minutes in the nitrogen and hydrogen atmosphere. Acetylene was introduced to the chamber and nitrogen flow was stopped at the end of the 3 minutes, and then the sample was heated to 630 degrees Celsius. CNT growth commenced for 5 minutes at 630 degrees Celsius and 10 Torr with 700 standard cubic centimeters per minute (sccm) of hydrogen and 100 sccm of acetylene as process gasses. Hydrogen and acetylene gas flow was stopped at the end of 5 minutes and the aluminum foil with CNTs adhered via multilayers was allowed to cool to 200 degrees Celsius in nitrogen flow.

Dense vertical CNT arrays approximately 12 micrometers tall were produced on the side of the aluminum foil facing up, and dense vertical CNT arrays approximately 10 micrometers tall were produced on the side of the aluminum foil facing the sample stage. The densities of CNTs on both sides of the foil were determined by scanning electron microscopy (SEM) to be about $1 \times 10^9$ nanotubes per $mm^2$. The diameters of the CNTs on both sides of the foil were determined by SEM to be about 10 nm. The produced CNTs were MWNTs, which had 5 walls on average.

The produced aluminum foil sample with CNTs adhered with multilayers on both sides was placed in a sonication bath of ethanol for 5 minutes. No CNTs were observed to release from the substrate during the sonication, which demonstrates the excellent adhesive and cohesive integrity of the joint. Upon removal from the ethanol, the CNTs in the array were patterned into discrete islands, demonstrating that solvent evaporation from the array can be an effective method to alter the morphology of the array.

Figure 6:
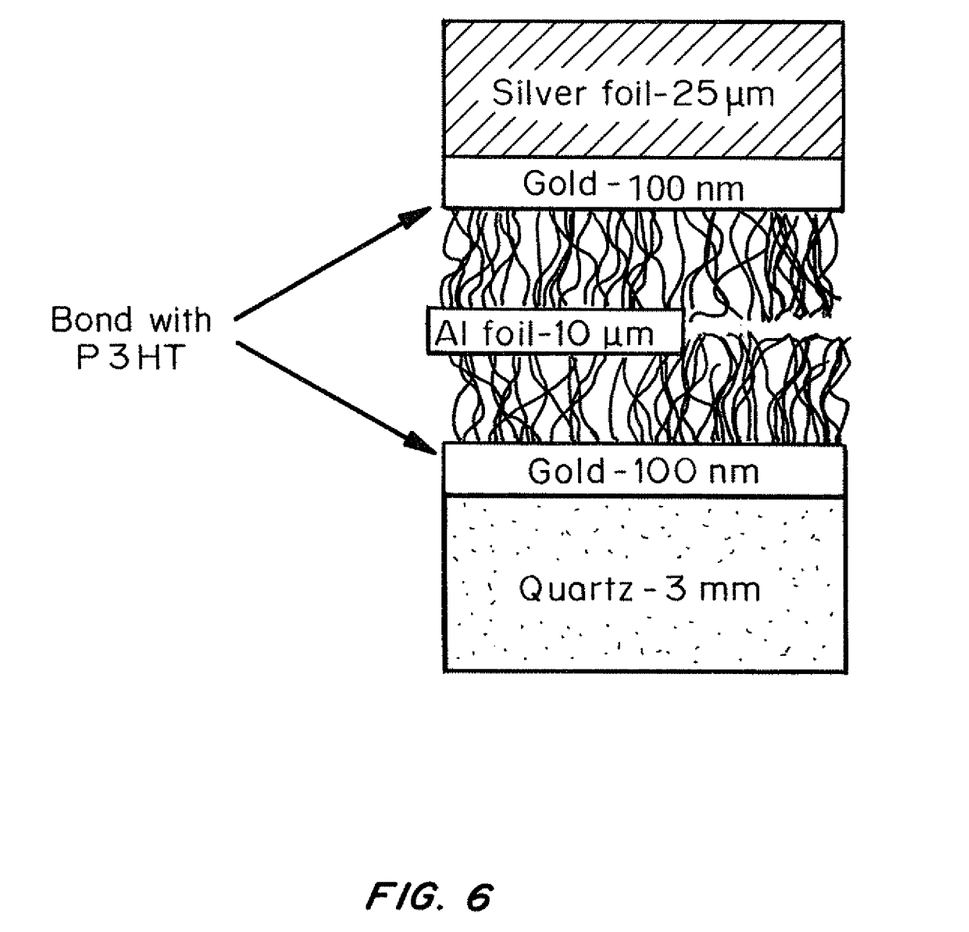
FIG. 6 is a diagram showing the distal ends of the CNT arrays on both sides of the aluminum foil coated with P3HT. The polymer-coated sample is adhered to gold-coated silver and quartz surfaces.

The distal ends of the CNT arrays on both sides of the aluminum foil were coated with P3HT by spray coating. The structure is shown in FIG. 6. The polymer-coated sample was pressed at 20 psi between gold-coated silver and quartz surfaces that were wet with chloroform. The interface was allowed to dry and the thermal resistance was measured using a photoacoutic technique. The thermal resistance was estimated to be approximately 7 $mm^2K/W$, which is a 70% reduction in resistance compared to the sample structure tested without the polymer coating.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

I claim:

1. A multilayer substrate for the growth and/or support of a plurality of carbon nanotubes comprising:
    an inert support;
    an adhesion layer between about 10 nm and about 150 nm in thickness present on one or more surfaces of the support, wherein the adhesion layer consists essentially of iron;
    an interface layer between about 5 nm and about 50 nm in thickness present on the adhesion layer, wherein the interface layer consists essentially of aluminum or aluminum oxide;
    and
    a catalytic layer between about 10 nm and about 1 nm in thickness located on the interface layer;
    wherein the adhesion layer and the catalytic layer have the same chemical composition, thereby reducing migration of the catalytic layer into the interface layer during nanotube synthesis and increasing yield and density of the carbon nanotubes formed on the catalytic layer relative to yield and density of carbon nanotubes formed on a multilayer substrate having a catalytic layer with a different chemical composition that that of an adhesion layer.

2. The substrate of claim 1, wherein the inert support is a metal selected from the group consisting of aluminum, platinum, gold, nickel, iron, tin, lead, silver, titanium, indium, copper, or combinations thereof.

3. The substrate of claim 1, wherein the inert support is a metal alloy.

4. The substrate of claim 3, wherein the alloy is copper-tungsten pseudoalloy, diamond in copper-silver alloy matrix, or combinations thereof.

5. The substrate of claim 1, wherein the support is selected from the group consisting of silicon carbide in an aluminum matrix, beryllium oxide in beryllium matrix, or combinations thereof.

6. The substrate of claim 1, wherein the adhesion layer is between about 10 nm and about 100 nm in thickness.

7. The substrate of claim 1, wherein the interface layer is between about 7 nm and about 30 nm in thickness.

8. The substrate of claim 1, wherein the catalytic layer is between about 5 nm and about 1 nm in thickness.

9. The substrate of claim 1, wherein the adhesion layer is about 30 nm in thickness, the interface layer is about 10 nm in thickness, and the catalytic layer is about 3 nm in thickness.

10. The substrate of claim 1, wherein the interface layer has a chemical composition which is different from the chemical composition of the adhesion layer and the catalytic layer.

11. An array of carbon nanotubes formed on the substrate of claim 1, wherein
    the interface layer is formed of a plurality of aluminum oxide nanoparticles or aggregates;
    the catalytic layer is formed of a plurality of catalytic nanoparticles or aggregates deposited on the aluminum oxide nanoparticles or aggregates; and
    a plurality of vertically aligned carbon nanotubes are attached to the catalytic nanoparticles or aggregates.

12. The array of claim 11, wherein the nanotubes are present at a density between about $1 \times 10^8$ and $1 \times 10^{10}$ nanotubes per $mm^2$ on the inert support.

13. The array of claim 11, wherein the nanotubes are present at a density between about $1 \times 10^9$ and $1 \times 10^{10}$ nanotubes per $mm^2$ on the inert support.

14. The array of claim 11, wherein the nanotubes are present at a density between about $1 \times 10^7$ and $1 \times 10^{11}$ nanotubes per $mm^2$ on the inert support.

15. The array of claim 11, wherein at least 90% of the carbon nanotubes remain on the surface after sonication in ethanol.

16. The array of claim 11, further comprising one or more polymers absorbed to the distal ends of the carbon nanotubes.

17. The array of claim 11, further comprising one or more metal nanoparticles absorbed to the distal ends of the carbon nanotubes.

18. The array of claim 11, further comprising a flowable or phase change material in the space between carbon nanotubes.

19. The array of claim 11, wherein the morphology of the array is modified by evaporating a liquid in which the array was immersed.

20. The array of vertically aligned carbon nanotubes according to claim 11 prepared by a process comprising:
    (a) annealing a multilayer substrate comprising an inert support, an adhesion layer present on one or more surfaces of the support wherein the adhesion layer consists essentially of iron, an interface layer present on the adhesion layer wherein the interface layer consists essentially of aluminum or aluminum oxide, and a catalytic layer, wherein the interface layer is present between the adhesion layer and the catalytic layer and wherein the adhesion layer and the catalytic layer have the same chemical composition; and
    (b) heating the multilayer substrate to a temperature of between 550° C. and 660° C.; and
    (c) introducing a carbon source gas.

21. The array of claim 20, wherein the interface layer has a chemical composition which is different from the chemical composition of the adhesion layer and the catalytic layer.

22. A method of forming an array of vertically aligned carbon nanotubes of claim 11 comprising:
(a) annealing a multilayer substrate comprising an inert support, an adhesion layer present on one or more surfaces of the support wherein the adhesion layer consists essentially of iron, an interface layer present on the adhesion layer wherein the interface layer consists essentially of aluminum or aluminum oxide, and a catalytic layer, wherein the interface layer is present between the adhesion layer and the catalytic layer and wherein the adhesion layer and the catalytic layer have the same chemical composition; and
(b) heating the multilayer substrate to a growth temperature of between 550° C. and 660° C.; and
(c) introducing a carbon source gas.

23. The method of claim 22, wherein the interface layer has a chemical composition which is different from the chemical composition of the adhesion layer and the catalytic layer.

* * * * *